US010289381B2

United States Patent
McDunn et al.

(10) Patent No.: US 10,289,381 B2
(45) Date of Patent: May 14, 2019

(54) METHODS AND SYSTEMS FOR CONTROLLING AN ELECTRONIC DEVICE IN RESPONSE TO DETECTED SOCIAL CUES

(71) Applicant: Motorola Mobility LLC, Chicago, IL (US)

(72) Inventors: Kevin J McDunn, Lake in the Hills, IL (US); Balaji Thiagarajan, San Jose, CA (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/961,224

(22) Filed: Dec. 7, 2015

(65) Prior Publication Data

US 2017/0161016 A1    Jun. 8, 2017

(51) Int. Cl.
| | |
|---|---|
| *G06F 3/16* | (2006.01) |
| *G10L 25/63* | (2013.01) |
| *G06K 9/00* | (2006.01) |
| *G06F 3/01* | (2006.01) |
| *G10L 15/22* | (2006.01) |

(52) U.S. Cl.
CPC .............. *G06F 3/167* (2013.01); *G06F 3/013* (2013.01); *G06F 3/017* (2013.01); *G06K 9/00335* (2013.01); *G06K 9/00604* (2013.01); *G10L 25/63* (2013.01); *G10L 2015/223* (2013.01)

(58) Field of Classification Search
CPC ............ G06K 9/00335; G06K 9/00604; G06F 3/013; G06F 3/017
See application file for complete search history.

(56) References Cited

U.S. PATENT DOCUMENTS

| | | | |
|---|---|---|---|
| 6,937,984 B1* | 8/2005 | Morgan .................. | G10L 15/22 704/270 |
| 2003/0021598 A1* | 1/2003 | Higashiyama ..... | G06K 9/00604 396/18 |
| 2007/0024579 A1* | 2/2007 | Rosenberg .............. | G06F 3/013 345/156 |
| 2007/0127704 A1 | 6/2007 | Marti et al. | |
| 2009/0305744 A1 | 12/2009 | Ullrich | |
| 2011/0022393 A1* | 1/2011 | Waller ............... | G01C 21/3608 704/270 |
| 2011/0125503 A1* | 5/2011 | Dong ...................... | G10L 15/22 704/275 |
| 2011/0208524 A1* | 8/2011 | Haughay ................. | G10L 15/22 704/246 |
| 2013/0190089 A1* | 7/2013 | Wilson .................... | G06F 3/017 463/36 |

(Continued)

FOREIGN PATENT DOCUMENTS

WO    2011141761 A1    11/2011

*Primary Examiner* — Qian Yang
(74) *Attorney, Agent, or Firm* — Philip H. Burrus, IV

(57) ABSTRACT

An electronic device includes an audio capture device, one or more physical sensors or context sensors, and one or more processors. A method of operating the electronic device includes receiving audio input, identifying a device command from the audio input, and detecting one or more multi-modal social cues from an environment about the electronic device. Where the one or more multi-modal social cues match one or more predefined criteria, the method executes a control operation in response to the device command.

18 Claims, 7 Drawing Sheets

(56) References Cited

U.S. PATENT DOCUMENTS

| | | | |
|---|---|---|---|
| 2013/0222271 A1* | 8/2013 | Alberth | G06F 1/163 345/173 |
| 2014/0112556 A1* | 4/2014 | Kalinli-Akbacak | G10L 25/63 382/128 |
| 2014/0241540 A1* | 8/2014 | Hodges | H04M 1/6066 381/74 |
| 2014/0267547 A1* | 9/2014 | Torgersrud | H04W 12/08 348/14.02 |
| 2015/0116510 A1* | 4/2015 | Chien | G06Q 30/0267 348/207.2 |
| 2015/0162004 A1* | 6/2015 | Goesnar | G10L 17/00 704/275 |
| 2016/0062469 A1* | 3/2016 | Abi-Rached | G06F 3/017 345/156 |

\* cited by examiner

METHODS AND SYSTEMS FOR CONTROLLING AN ELECTRONIC DEVICE IN RESPONSE TO DETECTED SOCIAL CUES

BACKGROUND

Technical Field

This disclosure relates generally to electronic devices, and more particularly to electronic devices having sensor devices.

Background Art

Electronic devices, and in particular portable, wireless communication devices, are becoming increasingly technologically advanced. In response, people are becoming more dependent upon their portable electronic devices. Only a few years ago a mobile telephone was a novelty item used only for making telephone calls. By contrast, people today rely upon "smartphones" to keep up with their calendars, address books, music collections, photo collections, and so forth. While the technological advances are making devices more complex, the physical size of these devices remains fairly constant, or alternatively, is getting smaller. Modern smartphones have evolved to the point that they serve as a computing device, entertainment device, productivity device, and communication device, all while neatly slipping into a pocket.

These smaller, yet more powerful, devices are being used for many different applications in many different environments. It would be advantageous to be able to detect certain environments and adapt performance of an electronic device to better perform in a given environment.

Figure 1:
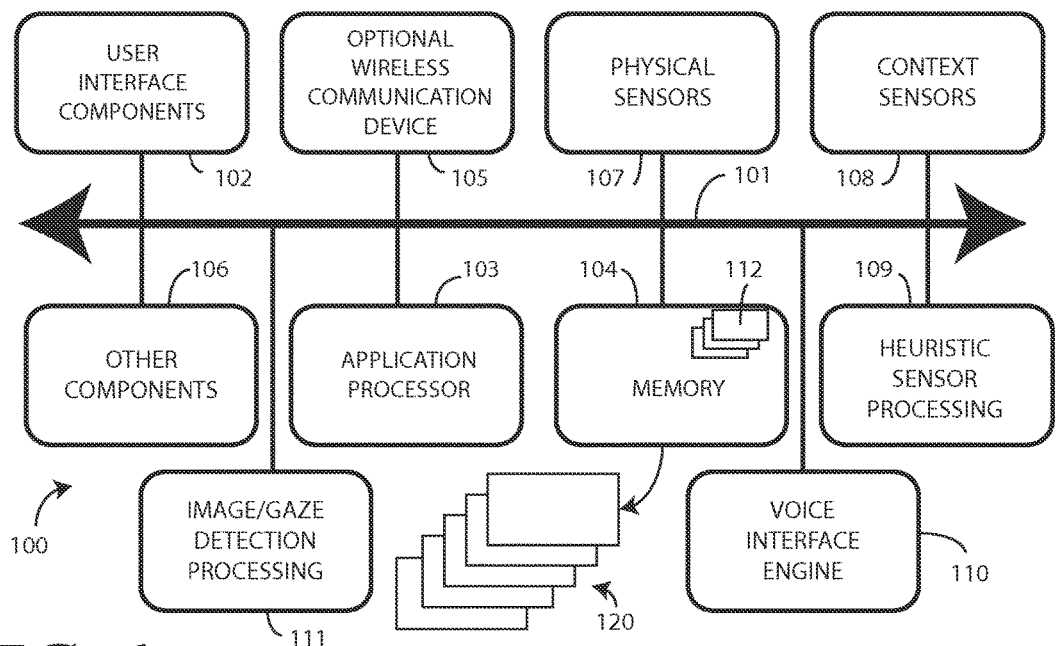
FIG. 1 illustrates one explanatory block diagram illustrating a schematic of one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using proximity sensor components to control operation of an electronic device in response to one or more multi-modal social cues. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of controlling device operation in response to one or more multi-modal social cues as described herein. The non-processor circuits may include, but are not limited to, a radio receiver, a radio transmitter, signal drivers, clock circuits, power source circuits, and user input devices. As such, these functions may be interpreted as steps of a method to perform device control in response to one or more multi-modal social cues. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that users would prefer to have simplified ways of interacting with electronic devices that more seamlessly integrate into their daily lifestyles, and with the general human experience as a whole. For example, when a person asks another person a question, simply annunciating the question is all that is required. Retrieving information from an electronic device is not so simple. To figure out, for instance, how tall the Willis Tower is using a smartphone, a user needs to unlock the device, navigate the user interface to a web browser, type in the question, wait for the response to load, and then read the response. To be sure, communicating with prior art devices is not as seamless as communicating with a person.

There have been some advances in electronic devices recently that have simplified things a bit. Many smartphones and other electronic devices have voice-controlled interfaces. Rather than typing a question into a web browser, a user can ask an automated voice control engine a question. However, prior to doing so, the user must activate the automated voice control engine. Even after doing so, the user must say a "trigger phrase" to queue the automated voice control engine to listen. Using an Android.sup.™ device, for instance, a user might need to say, "OK, Google Now, how tall is the Willis Tower?" While such a system is far more convenient than typing the question into a browser, embodiments of the disclosure contemplate that users would prefer a system that allowed voice control without having to first state a trigger phrase. In an ideal world, an electronic device would understand whenever its owner is asking for something with no trigger required to provide a more natural, humanistic experience.

Embodiments of the disclosure provide an electronic device that comes close to this ideal. In one or more embodiments, an electronic device includes one or more physical and/or context sensors that can operate in various sensing modes, e.g., acoustically and visually, to detect one or more multi-modal social cues that occur in natural conversation among people. Illustrating by example, in one embodiment one or more processors are operable with a combination of physical sensors and context sensors to analyze a voice print of an owner of the device. In one embodiment, one physical sensor is an audio capture device, such as a microphone, that is in an "always ON" state. As such, the audio capture device is able to capture audio input. The one or more processors, which can include a digital signal processor, can then identify whether one or more device commands are present in the audio input.

The one or more sensors are then able to detect one or more multi-modal social cues from an environment about the electronic device to corroborate that the user is in fact intending to ask something of the electronic device. Illustrating by example, an intelligent imager may detect that a user is gazing or otherwise looking at the electronic device. The intelligent imager may alternatively detect that a user is making a gesture, such as a point or wave, toward the electronic device. The one or more processors may communicate with a companion electronic device, such as a smart watch or smart ring, which include motion detectors, to receive electronic communications indicating that the companion device has detected a gesture. Other multi-modal social cues will be described below. Still others will be obvious to those of ordinary skill in the art having the benefit of this disclosure.

In one or more embodiments, the one or more processors can additionally determine the identity of the user to confirm that the user is in fact intending to ask something of the electronic device. For example, a voice interface engine can determine the identity of the user by matching a voiceprint to stored indicia corresponding to the user in memory. If the person asking a question is the owner of an electronic device, it is more likely that the question is intended for the electronic device than if asked by a stranger.

The one or more processors use the one or more sensors for detecting and inferring the social context of the environment about the electronic device. Illustrating by a simple example, in one embodiment an audio capture device samples ambient acoustic signals as audio input, searching for a pattern matching the known voice print of the owner of the electronic device, e.g., biometric characteristics associated with the owner with some level of uniqueness. If a match between the sampled signals and the known biometric voice print of the user is found, in one embodiment the electronic device might use another sensor, such as an intelligent imager in the form of a wide-angle front facing camera, to capture an image. One or more processors can then determine whether the one or more multi-modal social cues match one or more predefined criteria. For instance, the one or more processors may analyze the real-time image to see if the user is gazing in the direction of the electronic device.

If the user is in fact gazing at the electronic device, i.e., if the one or more multi-modal social cues match the one or more predefined criteria, the one or more processors can execute a control operation in response to the command from the audio input. Said differently, in one embodiment the one or more processors can process the buffered audio signal, perform speech-to-text conversion, and parse the words to determine if any meaningful device commands were uttered indicating that a control operation should be performed.

If a device command is found, in one embodiment the one or more processors can optionally prompt the user and ask for confirmation. Illustrating by example, if the user said, "Please call my wife," while looking at the phone, the one or more processors may deliver, with an output device such as a loudspeaker, an output to confirm the device command. In this example, the one or more processors may cause the loudspeaker to emit a voice stating, "Would you like me to call your wife?" When this occurs, the user can respond, for instance by stating, "yes." The one or more processors receive this confirmation with the audio capture device. Accordingly, the one or more processors can execute the control operation, here making a telephone call to the user's wife, in response to the device command. One advantage of using the optional confirmation step is that if the command was parsed in error, the user may simply say "no." When this occurs iteratively, the one or more processors can use this feedback to learn and improve accuracy.

Other physical or context sensors can be used to detect multi-modal social cues as well. For example, one or more proximity detectors may be used with, or substituted for, the intelligent imager to detect gestures. The physical and context sensors can include infrared sensors, digital thermopile sensors, acoustic sensors, or low-resolution/low-power image sensors to detect, for example, a pointing gesture. Likewise, a simple nudge of the device may be detected by a motion detector. In another embodiment, an approach gesture may be detected by a proximity detector, and may be used as a way of temporarily bypassing a trigger phrase and arming the system to buffer and parse any spoken commands. Other sensors will be described below. Still others will be obvious to those of ordinary skill in the art having the benefit of this disclosure.

Turning now to FIG. 1, illustrated therein is one explanatory block diagram schematic 100 of an electronic device in accordance with one or more embodiments of the disclosure. The electronic device with which the block diagram schematic 100 can be one of various types of devices. In one embodiment, the electronic device is a portable electronic device, one example of which is a smartphone that will be used in subsequent figures for illustrative purposes. However, it should be obvious to those of ordinary skill in the art having the benefit of this disclosure that the block diagram schematic 100 could be used with other devices as well, including conventional desktop computers, palm-top computers, tablet computers, gaming devices, media players, wearable devices, or other devices. Still other devices will be obvious to those of ordinary skill in the art having the benefit of this disclosure.

In one or more embodiments, the block diagram schematic 100 is configured as a printed circuit board assembly disposed within a device housing. In one embodiment, the housing includes two housing members. A front housing member can define a front of the electronic device, while a rear-housing member forms the backside of the electronic device. Features can be incorporated into the housing members. Examples of such features include a camera, an intelligent imager, or an optional speaker port. Additionally, a user interface component such as a button or touch sensitive surface, can also be disposed along a housing member. Various components can be electrically coupled together by conductors or a bus 101 disposed along a printed circuit board.

The illustrative block diagram schematic 100 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

The illustrative block diagram schematic 100 includes a user interface 102. In one or more embodiments, the user interface 102 includes a display, which may optionally be touch-sensitive. In one embodiment, users can deliver user input to the display of such an embodiment by delivering touch input from a finger, stylus, or other objects disposed proximately with the display. In one embodiment, the display is configured as an active matrix organic light emitting diode (AMOLED) display. However, it should be noted that other types of displays, including liquid crystal displays, suitable for use with the user interface 102 would be obvious to those of ordinary skill in the art having the benefit of this disclosure.

In one embodiment, the electronic device includes one or more processors 103. In one embodiment, the one or more processors 103 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 100. Each of the application processor and the auxiliary processor(s) can be configured to process and execute executable software code to perform the various functions of the electronic device with which the block diagram schematic 100 operates. A storage device, such as memory 104, can optionally store the executable software code used by the one or more processors 103 during operation.

In this illustrative embodiment, the block diagram schematic 100 also includes a communication circuit 105 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 105 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 105 can include wireless communication circuitry, one of a receiver, a transmitter, or transceiver, and one or more antennas.

In one embodiment, the one or more processors 103 can be responsible for performing the primary functions of the electronic device with which the block diagram schematic 100 is operational. For example, in one embodiment the one or more processors 103 comprise one or more circuits operable with the user interface 102 to present presentation information to a user. The executable software code used by the one or more processors 103 can be configured as one or more modules 120 that are operable with the one or more processors 103. Such modules 120 can store instructions, control algorithms, and so forth.

Other components 106 operable with the one or more processors 103 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

Various sensors can be operable with the one or more processors 103. As shown in FIG. 1, these sensors can be categorized into physical sensors 107 and context sensors 108. Generally speaking, physical sensors 107 include sensors configured to sense or determine physical parameters indicative of conditions in an environment about an electronic device. Illustrating by example, the physical sensors 107 can include devices for determining information such as motion, acceleration, orientation, proximity to people and other objects, lighting, capturing images, and so forth. The physical sensors 107 can include various combinations of microphones, location detectors, temperature sensors, barometers, proximity sensor components, proximity detector components, wellness sensors, touch sensors, cameras, audio capture devices, and so forth. Many examples of physical sensors 107 will be described below with reference to FIG. 2. Others will be obvious to those of ordinary skill in the art having the benefit of this disclosure.

By contrast, the context sensors 108 do not measure physical conditions or parameters. Instead, they infer context from data of the electronic device. Illustrating by example, when a physical sensor 107 includes a camera or intelligent imager, the context sensors 108 can use data captured in images to infer contextual cues. An emotional detector may be operable to analyze data from a captured image to determine an emotional state. The emotional detector may identify facial gestures such as a smile or raised eyebrow to infer a person's silently communicated emotional state, e.g. joy, anger, frustration, and so forth. Other context sensors 108 may analyze other data to infer context, including calendar events, user profiles, device operating states, energy storage within a battery, application data, data from third parties such as web services and social media servers, alarms, time of day, behaviors a user repeats, and other factors. Many examples of the context sensors 108 will be described below with reference to FIG. 3. Others will be obvious to those of ordinary skill in the art having the benefit of this disclosure. The context sensors 108 can be configured as either hardware components, or alternatively as combinations of hardware components and software components. The context sensors 108 can be configured to collect and analyze non-physical parametric data.

A heuristic sensor processor 109 is operable with both the physical sensors 107 and the context sensors 108 to detect, infer, capture, and otherwise determine when multi-modal social cues are occurring in an environment about an electronic device. In one embodiment, the heuristic sensor processor 109 determines, from one or both of the physical sensors 107 or the context sensors 108, assessed contexts and frameworks using adjustable algorithms of context assessment employing information, data, and events. These assessments may be learned through repetitive data analysis. Alternatively, a user may employ the user interface 102 to enter various parameters, constructs, rules, and/or paradigms that instruct or otherwise guide the heuristic sensor processor 109 in detecting multi-modal social cues, emotional states, moods, and other contextual information. The heuristic sensor processor 109 can comprise an artificial neural network or other similar technology in one or more embodiments.

In one or more embodiments, the heuristic sensor processor 109 is operable with the one or more processors 103. In some embodiments, the one or more processors 103 can control the heuristic sensor processor 109. In other embodiments, the heuristic sensor processor 109 can operate independently, delivering information gleaned from detecting multi-modal social cues, emotional states, moods, and other contextual information to the one or more processors 103. The heuristic sensor processor 109 can receive data from one or both of the physical sensors 107 or the context sensors 108. In one or more embodiments, the one or more processors 103 are configured to perform the operations of the heuristic sensor processor 109.

In one or more embodiments, the block diagram schematic 100 includes a voice interface engine 110. The voice interface engine 110 can include hardware, executable code, and speech monitor executable code in one embodiment. The voice interface engine 110 can include, stored in memory 218, basic speech models, trained speech models, or other modules that are used by the voice interface engine 110 to receive and identify voice commands that are received with audio input captured by an audio capture device. In one embodiment, the voice interface engine 110 can include a voice recognition engine. Regardless of the specific implementation utilized in the various embodiments, the voice interface engine 110 can access various speech models to identify speech commands.

In one embodiment, the voice interface engine 110 is configured to implement a voice control feature that allows a user to speak a specific device command to cause the one or more processors 103 to execute a control operation. For example, the user may say, "How tall is the Willis Tower?" This question comprises a device command requesting the one or more processors to retrieve, with the communication circuit 105, information from the Internet to answer the question. Consequently, this device command can cause the one or more processors 103 to access an application module, such as a web browser, to search for the answer and then deliver the answer as audible output via an audio output of the other components 106. In short, in one embodiment the voice interface engine 110 listens for voice commands, processes the commands and, in conjunction with the one or more processors 103, returns an output that is the result of the user's intent.

The block diagram schematic 100 can also include an image/gaze detection-processing engine 111. The image/gaze detection-processing engine 111 can be operable with the physical sensors 107, such as a camera or intelligent imager, to process information to detect a user's gaze point. The image/gaze detection-processing engine 111 can optionally include sensors for detecting the alignment of a user's head in three-dimensional space. Electronic signals can then be delivered from the sensors to the image/gaze detection-processing engine 111 for computing the direction of user's gaze in three-dimensional space. The image/gaze detection-processing engine 111 can further be configured to detect a gaze cone corresponding to the detected gaze direction, which is a field of view within which the user may easily see without diverting their eyes or head from the detected gaze direction. The image/gaze detection-processing engine 111 can be configured to alternately estimate gaze direction by inputting images representing a photograph of a selected area near or around the eyes.

Figure 2:
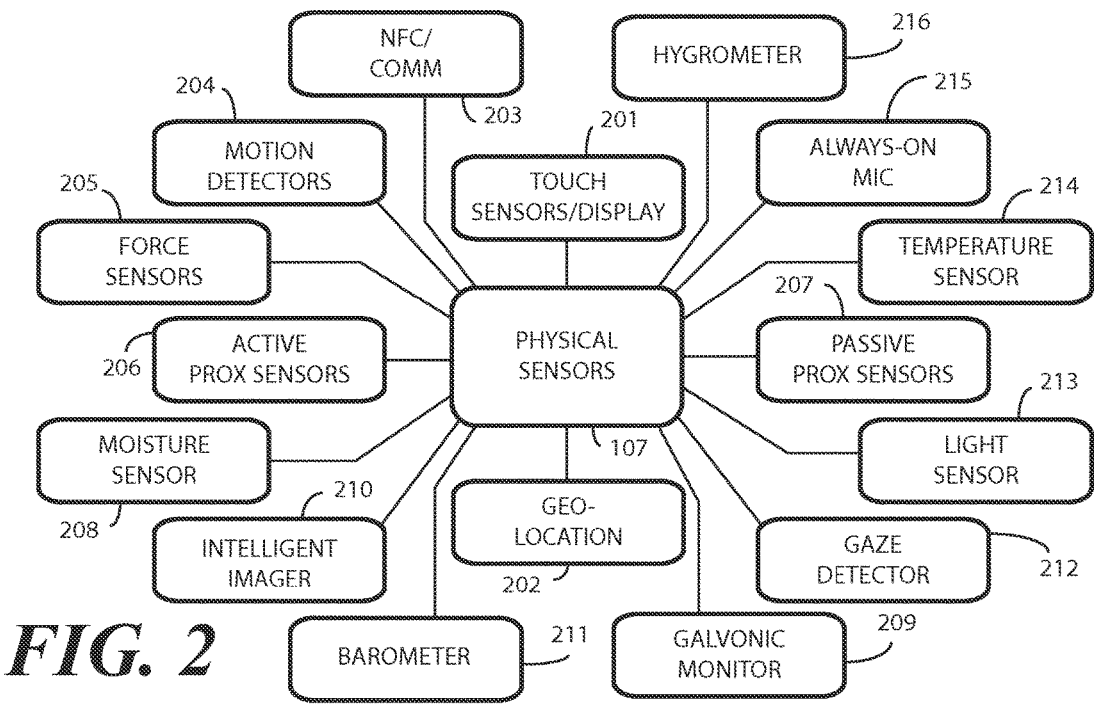
FIG. 2 illustrates one or more physical sensors suitable for use, alone or in combination, in an electronic device in accordance with one or more embodiments of the disclosure.

Turning now to FIG. 2, illustrated therein are various examples of the physical sensors 107 described above with reference to FIG. 1. As noted above, physical sensors 107 to sense or determine physical parameters indicative of conditions in an environment about an electronic device. FIG. 2 illustrates several examples physical sensors 107. It should be noted that those shown in FIG. 2 are not comprehensive, as others will be obvious to those of ordinary skill in the art having the benefit of this disclosure. Additionally, it should be noted that the various physical sensors 107 shown in FIG. 2 could be used alone or in combination. Accordingly, many electronic devices will employ only subsets of the physical sensors 107 shown in FIG. 2, with the particular subset defined by device application.

A first example of a physical sensor is a touch sensor 201. The touch sensor 201 can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors (103), to detect an object in close proximity with—or touching—the surface of the display or the housing of an electronic device by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a physical sensor 107 is a geo-locator that serves as a location detector 202. In one embodiment, location detector 202 is able to determine location data when an image is captured from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the location detector 202 autonomously or with assistance from terrestrial base stations, for example those associated with a cellular communication network or other ground based network, or as part of a Differential Global Positioning System (DGPS), as is well known by those having ordinary skill in the art. The location detector 202 may also be able to determine location by locating or triangulating terrestrial base stations of a traditional cellular network, such as a CDMA network or GSM network, or from other local area networks, such as Wi-Fi networks.

Another physical sensor 107 is a near field communication circuit 203. The near field communication circuit 203 can be included for communication with local area networks to receive information regarding the context of the environment in which an electronic device is located. Illustrating by example, the near field communication circuit 203 may obtain information such as weather information and location information. If, for example, a user is at a museum, they may be standing near an exhibit that can be identified with near field communication. This identification can indicate that the electronic device is both indoors and at a museum. Accordingly, if the user requests additional information about an artist or a painting, there is a higher probability that the question is a device command asking the one or more processors (103) to search for than information with a web browser. Alternatively, the near field communication circuit 203 can be used to receive contextual information from kiosks and other electronic devices. The near field communication circuit 203 can also be used to obtain image or other data from social media networks. Examples of suitable near field communication circuits include Bluetooth communication circuits, IEEE 801.11 communication circuits, infrared communication circuits, magnetic field modulation circuits, and Wi-Fi circuits.

Another example of a physical sensor 107 is the motion detector 204. Illustrating by example, an accelerometer, gyroscopes, or other device can be used as a motion detector 204 in an electronic device. Using an accelerometer as an example, an accelerometer can be included to detect motion of the electronic device. Additionally, the accelerometer can be used to sense some of the gestures of the user, such as one talking with their hands, running, or walking.

The motion detector 204 can also be used to determine the spatial orientation of an electronic device as well in three-dimensional space by detecting a gravitational direction. In addition to, or instead of, an accelerometer, an electronic compass can be included to detect the spatial orientation of the electronic device relative to the earth's magnetic field. Similarly, one or more gyroscopes can be included to detect rotational motion of the electronic device.

Another example of a physical sensor 107 is a force sensor 205. The force sensor can take various forms. For example, in one embodiment, the force sensor comprises resistive switches or a force switch array configured to detect contact with either the display or the housing of an electronic device. The array of resistive switches can function as a force-sensing layer, in that when contact is made with either the surface of the display or the housing of the electronic device, changes in impedance of any of the switches may be detected. The array of switches may be any of resistance sensing switches, membrane switches, force-sensing switches such as piezoelectric switches, or other equivalent types of technology. In another embodiment, the force sensor can be capacitive. In yet another embodiment, piezoelectric sensors can be configured to sense force as well. For example, where coupled with the lens of the display, the piezoelectric sensors can be configured to detect an amount of displacement of the lens to determine force. The piezoelectric sensors can also be configured to determine force of contact against the housing of the electronic device rather than the display.

Another example of physical sensors 107 includes proximity sensors. The proximity sensors fall in to one of two camps: active proximity sensors and "passive" proximity sensors. These are shown as proximity detector components 206 and proximity sensor components 207 in FIG. 2. Either the proximity detector components 206 or the proximity sensor components 207 can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components 207 comprise a signal receiver to receive signals from objects external to the housing of an electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components 207 have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

Proximity sensor components 207 are sometimes referred to as a "passive IR system" due to the fact that the person is the active transmitter. Accordingly, the proximity sensor component 207 requires no transmitter since objects disposed external to the housing deliver emissions that are received by the infrared receiver. As no transmitter is required, each proximity sensor component 207 can operate at a very low power level. Simulations show that a group of infrared signal receivers can operate with a total current drain of just a few microamps.

In one embodiment, the signal receiver of each proximity sensor component 207 can operate at various sensitivity levels so as to cause the at least one proximity sensor component 207 to be operable to receive the infrared emissions from different distances. For example, the one or more processors (103) can cause each proximity sensor component 207 to operate at a first "effective" sensitivity so as to receive infrared emissions from a first distance. Similarly, the one or more processors (103) can cause each proximity sensor component 207 to operate at a second sensitivity, which is less than the first sensitivity, so as to receive infrared emissions from a second distance, which is less than the first distance. The sensitivity change can be effected by causing the one or more processors (103) to interpret readings from the proximity sensor component 207 differently.

By contrast, proximity detector components 206 include a signal emitter and a corresponding signal receiver. While each proximity detector component 206 can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components 206 comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component 206 can be an infrared proximity sensor set that uses a signal emitter that transmits a beam of infrared light that reflects from a nearby object and is received by a corresponding signal receiver. Proximity detector components 206 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

Another example of a physical sensor is a moisture detector 208. A moisture detector 208 can be configured to detect the amount of moisture on or about the display or the housing of the electronic device. This can indicate various forms of context. Sometimes, it can indicate rain or drizzle in the environment about the electronic device. Accordingly, if a user is frantically asking "Call a cab!" the fact that moisture is present may increase the likelihood that this ask is a device command. The moisture detector 208 can be realized in the form of an impedance sensor that measures impedance between electrodes. As moisture can be due to external conditions, e.g., rain, or user conditions, perspiration, the moisture detector 208 can function in tandem with ISFETS configured to measure pH or amounts of NaOH in the moisture or a galvanic sensor 209 to determine not only the amount of moisture, but whether the moisture is due to external factors, perspiration, or combinations thereof.

An intelligent imager 210 can be configured to capture an image of an object and determine whether the object matches predetermined criteria. For example, the intelligent imager 210 operate as an identification module configured with optical recognition such as include image recognition, character recognition, visual recognition, facial recognition, color recognition, shape recognition and the like. Advantageously, the intelligent imager 210 can be used as a facial recognition device to determine the identity of one or more persons detected about an electronic device. For example, in one embodiment when the one or more proximity sensor components 207 detect a person, the intelligent imager 210 can capture a photograph of that person. The intelligent imager 210 can then compare the image to a reference file stored in memory (104), to confirm beyond a threshold authenticity probability that the person's face sufficiently matches the reference file. Beneficially, optical recognition allows the one or more processors (103) to execute control operations only when one of the persons detected about the electronic device are sufficiently identified as the owner of the electronic device.

In addition to capturing photographs, the intelligent imager 210 can function in other ways as well. For example, in some embodiments the intelligent imager 210 can capture multiple successive pictures to capture more information that can be used to determine social cues. Alternatively, the intelligent imager 210 can capture or video frames, with or without accompanying metadata such as motion vectors. This additional information captured by the intelligent imager 210 can be used to detect richer social cues that may be inferred from the captured data.

A barometer 211 can sense changes in air pressure due to environmental and/or weather changes. In one embodiment, the barometer 211 includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

A gaze detector 212 can comprise sensors for detecting the user's gaze point. The gaze detector 212 can optionally include sensors for detecting the alignment of a user's head in three-dimensional space. Electronic signals can then be delivered from the sensors to the gaze detection processing (111) for computing the direction of user's gaze in three-dimensional space. The gaze detector 212 can further be configured to detect a gaze cone corresponding to the detected gaze direction, which is a field of view within which the user may easily see without diverting their eyes or head from the detected gaze direction. The gaze detector 212 can be configured to alternately estimate gaze direction by inputting to the gaze detection processing (111) images representing a photograph of a selected area near or around the eyes. It will be clear to those of ordinary skill in the art having the benefit of this disclosure that these techniques are explanatory only, as other modes of detecting gaze direction can be substituted in the gaze detector 212 of FIG. 2.

A light sensor 213 can detect changes in optical intensity, color, light, or shadow in the environment of an electronic device. This can be used to make inferences about context such as weather or other cues. For example, if the light sensor 213 detects low-light conditions in the middle of the day when the location detector 202 indicates that the electronic device is outside, this can be due to cloudy conditions, fog, or haze. An infrared sensor can be used in conjunction with, or in place of, the light sensor 213. The infrared sensor can be configured to detect thermal emissions from an environment about an electronic device. Where, for example, the infrared sensor detects heat on a warm day, but the light sensor detects low-light conditions, this can indicate that the electronic device is in a room where the air conditioning is not properly set. Similarly, a temperature sensor 214 can be configured to monitor temperature about an electronic device.

The physical sensors 107 can also include an audio capture device 215. In one embodiment, the audio capture device 215 includes one or more microphones to receive acoustic input. While the one or more microphones can be used to sense voice input, voice commands, and other audio input, in some embodiments they can be used as environmental sensors to sense environmental sounds such as rain, wind, and so forth.

In one embodiment, the one or more microphones include a single microphone. However, in other embodiments, the one or more microphones can include two or more microphones. Where multiple microphones are included, they can be used for selective beam steering to, for instance, determine from which direction a sound emanated. Illustrating by example, a first microphone can be located on a first side of the electronic device for receiving audio input from a first direction, while a second microphone can be placed on a second side of the electronic device for receiving audio input from a second direction. The one or more processors (103) can then select between the first microphone and the second microphone to beam steer audio reception toward the user. Alternatively, the one or more processors (103) can process and combine the signals from two or more microphones to perform beam steering.

In one embodiment, the audio capture device 215 comprises an "always ON" audio capture device. As such, the audio capture device 215 is able to capture audio input at any time that an electronic device is operational. As noted above, in one or more embodiments, the one or more processors, which can include a digital signal processor, can identify whether one or more device commands are present in the audio input captured by the audio capture device 215.

One further example of the physical sensors 107 is a hygrometer 216. The hygrometer 216 can be used to detect humidity, which can indicate that a user is outdoors or is perspiring. As noted above, the illustrative physical sensors of FIG. 2 are not comprehensive. Numerous others could be added. For example, a wind-speed monitor could be included to detect wind. Accordingly, the physical sensors 107 of FIG. 2 are illustrative only, as numerous others will be obvious to those of ordinary skill in the art having the benefit of this disclosure.

Figure 3:
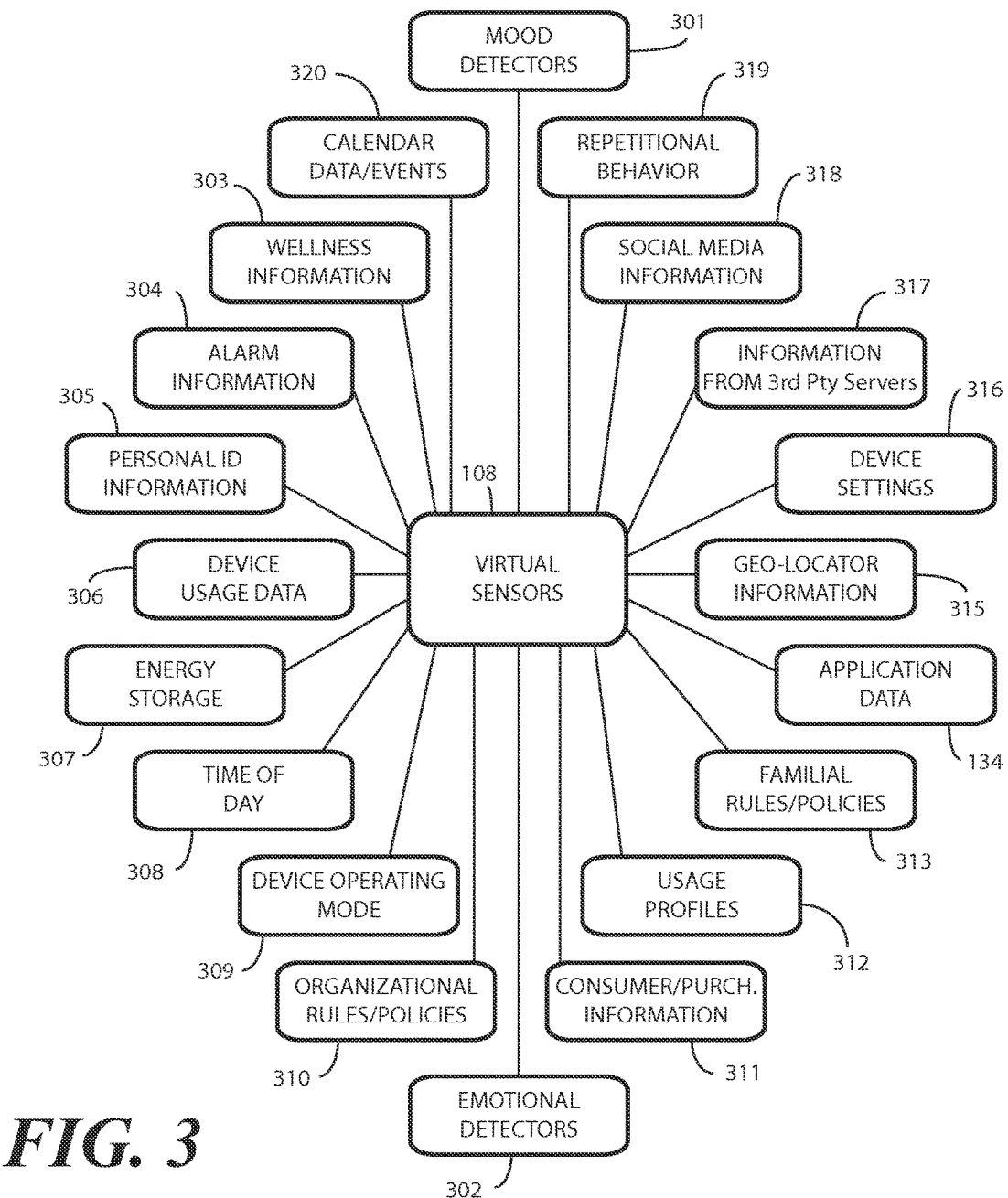
FIG. 3 illustrates one or more context sensors suitable for use, alone or in combination, in an electronic device in accordance with one or more embodiments of the disclosure.

Turning to FIG. 3, illustrated therein are various examples of context sensors 108. As with FIG. 2, the examples shown in FIG. 3 do not constitute a comprehensive list. Numerous other context sensors 108 will be obvious to those of ordinary skill in the art having the benefit of this disclosure.

In one embodiment, a mood detector 301 can infer a person's mood based upon contextual information received from the physical sensors (107). For example, if the intelligent imager (210) captures a picture, multiple successive pictures, video, or other information from which a person can be identified as the owner of the electronic device, and she is crying in the picture, multiple successive pictures, video, or other information, the mood detector 301 can infer that she is either happy or sad. Similarly, if the audio capture device (215) captures a user's voice and the user is yelling or cursing, the mood detector 301 can infer that the user is likely angry or upset.

The emotional detector 302 can function in a similar manner to infer a person's emotional state from contextual information received from the physical sensors (107). Illustrating by example, if the intelligent imager (210) captures a picture, multiple successive pictures, video, or other information relating to of the owner of an electronic device, the emotional detector 302 can infer their silently communicated emotional state, e.g. joy, anger, frustration, and so forth. This can be inferred from, for example, facial gestures such as a raised eyebrow, grin, or other feature. In one or more embodiments, such emotional cues can indicate the user is intending to issue a command to the electronic device. Alternatively, emotion can be detected from voice inflections, or words used. If someone screams, "I hate you," there are likely negative emotional issues involved, for example.

Calendar information and events 320 can be used to detect social cues. If, for example, a calendar event indicates that a birthday party is occurring, this can imply festive and jovial social cues. However, if a funeral is occurring, it is unlikely that a user will be issuing device commands to an electronic device as funerals tend to be quiet affairs.

Wellness information 303 can be used to detect social cues. If, for example, wellness information 303 indicates that a person's heart rate is high, and they are perspiring, and the location information 315 indicates that a person is in an alley of a city, and the time of day information 308 indicates that its 3 AM, the person may be under duress. Accordingly, the command "Call 911" is highly likely to be a device command.

Alarm information 304 can be used to detect social cues. If an alarm has just sounded at 6:00 AM, the command "snooze" is likely to be a device command. Personal identification information 305 can be used to detect social cues as well. If a person is a diabetic, and wellness sensors show them to be clammy and sweaty, this could be due to low insulin. Accordingly, the command "Call 911" is highly likely to be a device command.

Device usage data 306 can indicate social cues. If a person is searching the web, and an incoming call is received, the command "decline" is likely to be a device command. Energy storage 307 within an electronic device can be used to indicate a social cue. Device operating mode information 309 can be used in a similar fashion. When energy storage drops to, for example, ten percent, the command "shut down all non-critical apps" is likely to be a device command.

Consumer purchase information 311 can certainly indicate social cues. If, for example, a person is a sommelier and frequently purchases wine, when viewing a web browser and finding a bottle of '82 Lafite for under $1000, the command "buy that wine now" is likely to be a device command.

Device usage profiles 312 can be used to infer social cues as well. If, for example, a person never uses an electronic device between 10:00 PM and 6:00 AM due to the fact that they are sleeping, if they happen to talk in their sleep and say, "order a pizza—I'm starving," this is not likely to be a device command.

Organizations can have formal rules and policies 310, such as meetings cannot last more than an hour without a break, one must take a lunch break between noon and 2:00 PM, and brainstorming sessions occur every morning between 9:00 and 10:00 AM. Similarly, families can have similar rules and policies 313, such as dinner occurs between 6:00 and 7:00 PM. This information can be used to infer social cues such as whether a person is likely to be in conversation with other people. When this is the case, spoken questions are less likely to be device commands. By contrast, when a user is likely to be alone, spoken commands are more likely to be device commands.

Application data 314 can indicate social cues. If a person frequently interacts with word processing applications during the day, the commands "cut" and "paste" are more likely to be device commands that they would for someone who instead plays video games with flying birds. Device settings 316 can indicate social cues as well. If a user sets their electronic device to alarm clock mode, it may be likely that they are sleeping and are not issuing device commands.

Social media 318 in formation can indicate social cues. For example, in one embodiment information relating to multi-modal social cues from an environment about the electronic device can be inferred from retrieving information from a social media server. For example, real time searches, which may be a keyword search, image search, or other search, of social media services can find images, posts, and comments relating to a location determined by the location information 315. Images posted on a social media service server that were taken at the same location may reveal multi-modal social cues. Alternatively, commentary regarding the location may imply social cues. Information from third party servers 317 can be used in this manner as well.

One further example of the context sensors 108 is repetitive behavior information 319. If, for example, a person always stops at a coffee shop between 8:00 and 8:15 AM on their way to work, the command, "Pay for the coffee," is likely to be a device command. As with FIG. 2 above, the physical sensors of FIG. 3 do not constitute a comprehensive list. Context sensors 108 can be any type of device that infers context from data of the electronic device. The context sensors 108 can be configured as either hardware components, or alternatively as combinations of hardware components and software components. The context sensors 108 can sensors can analyze information to, for example, not only detect the user, but also to determine the social cues and emotional affect of other people in the vicinity of the electronic device, thereby further informing inferences about the user's intent and what executable control commands are appropriate given this composite social context. The context sensors 108 can be configured to collect and analyze non-physical parametric data. While some are shown in FIG. 3, numerous others could be added. Accordingly, the context sensors 108 of FIG. 3 are illustrative only, as numerous others will be obvious to those of ordinary skill in the art having the benefit of this disclosure. It should be noted that one or both of the physical sensors (107) or the context sensors 108, when used in combination, can be cascaded in a predefined order to detect a plurality of multi-modal social cues to determine whether the device command is intended for the electronic device.

Figure 4:
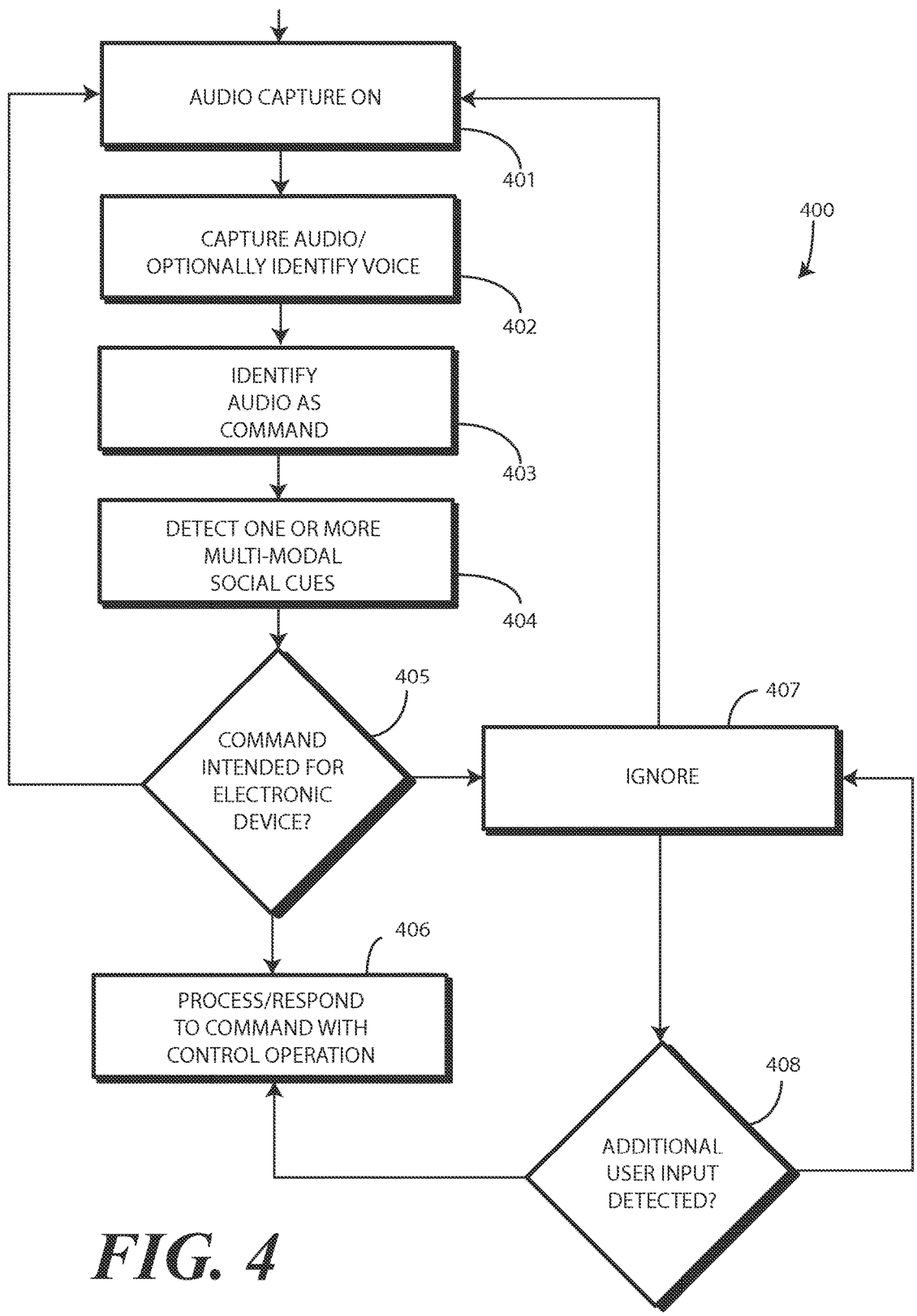
FIG. 4 illustrates an explanatory method in accordance with one or more embodiments of the disclosure.

Turning now to FIG. 4, illustrated therein is one explanatory method 400 for operating an electronic device in accordance with one or more embodiments of the disclosure. Beginning at step 401, one or more physical sensors (107) are actuated. In one embodiment, the one or more physical sensors (107) include an audio capture device (215). In one embodiment at step 401, the audio capture device (215) comprises an "always ON" audio capture device. At step 402, the audio capture device (215) captures audio input.

At step 403, the method 400 identifies, with one or more processors (103), a device command from the audio input. In one or more embodiments, a device command comprises a call to action. Illustrating by example, the question "How are you doing?" is not a device command because no action is requested. By contrast, the statement "Call my wife" can be a device command because it includes a call to action, namely, that a person be contacted telephonically.

Figure 5:
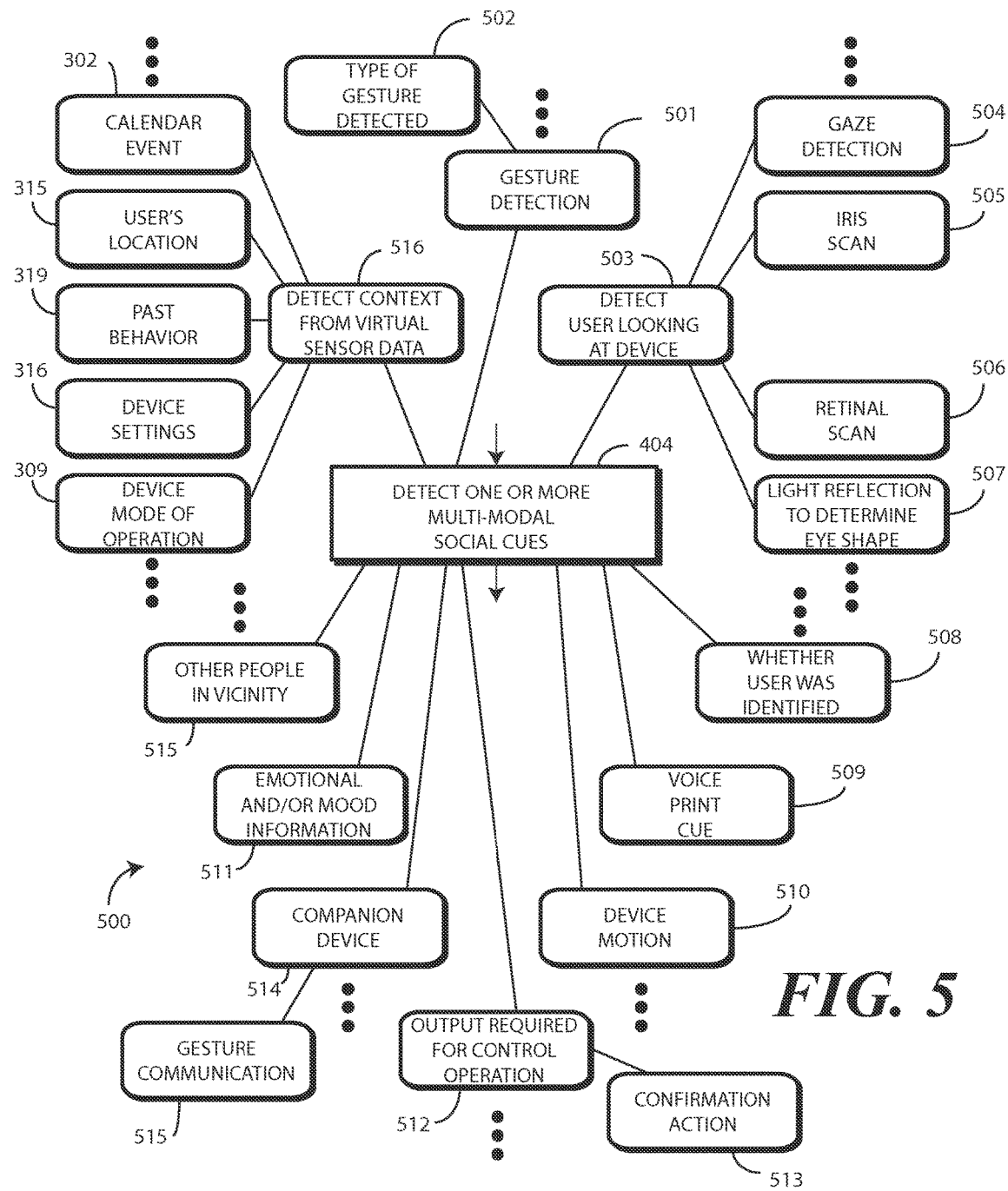
FIG. 5 illustrates various multi-modal social cues that can be sensed by one or more physical or context sensors from an environment about an electronic device in accordance with one or more embodiments of the disclosure.

At step 404, the method 400 detects, with one or more physical sensors (107) or one or more context sensors (108) one or more multi-modal social cues from an environment about an electronic device. Turning briefly to FIG. 5, illustrated therein are a few examples of the myriad of multi-modal social cues 500 that may be detected using the one or more physical sensors (107) or one or more context sensors (108), alone or in combination, at step 404.

One of the simpler multi-modal social cues is a gesture 501. If, for example, a person says, "what time is it," it can be quickly and conveyed to the one or more processors (103) of an electronic device that this question constitutes a device command when said in conjunction with a predefined multi-modal social cue. The question could be to a friend. Alternatively, it could be a device command. Accordingly, in one or more embodiments when it is accompanied by a multi-modal social cue 500 matching one or more predefined criteria (112), the one or more processors (103) are to interpret the question as a device command and are to execute a control operation in response to the device command.

Consider this example: a user says, "What time is it" and then points at the electronic device. In one embodiment, this pointing constitutes a gesture 501, and the gesture 501 matches a predefined criterion (112) stored in a memory (104) in that it is directed toward the electronic device. Accordingly, where the gesture 501 matches one or more predefined criteria (112), the one or more processors (103) can execute a control operation in response to the device command. Here, the one or more processors might announce the time with an audio output of the other components (106) of the electronic device.

The type of gesture 502 can, in one or more embodiments, determine whether the gesture 501 matches the one or more predefined criteria (112). Illustrating by example, a user may be jumping up and down while making statements. The user may be exercising, for example. While the proximity detector components (206) or proximity sensor components (207) can detect this gesture, it may not meet a predefined criterion (112) stored in memory (104) because it is not contextually relevant. By contrast, a hand wave toward the device, or a point toward the device, or device motion 510 such as shaking the device itself, would be more contextually relevant and thus may in fact match a predefined criterion (112).

Another example of a multi-modal social cue 500 matching one or more predefined criteria (112) occurs when a user is looking 503 toward the electronic device. This can be determined in one of a variety of ways. In one embodiment, a gaze detector (212) can detect a gaze 504 toward the electronic device. In another embodiment, an intelligent imager (210) might perform an iris scan 505 of a user's eye. In another embodiment, the intelligent imager (210) might perform a retinal scan. In still other embodiments, the intelligent imager (210) might use other biometrics, such a light reflection from a person's eyeball to determine which way the eye is looking. When one of these actions occurs in conjunction with a device command meeting one or more predefined criteria (112), a control operation in response to the device command can be executed.

Other examples of multi-modal social cues 500 include whether a user was identified, or alternatively, how the user was identified. Embodiments of the disclosure contemplate that, in one or more embodiments, methods described herein may be required to determine the identity of a user prior to executing a control operation. For example, if someone asks, "What is the credit card number of the personal card I have stored?", embodiments of the disclosure contemplate that this information should only be conveyed to the actual owner of the electronic device. Accordingly, in one or more embodiments the multi-modal social cues comprise determining whether an identity 508 matches a predefined criterion (112), namely, whether the identity 508 is that of the owner of the electronic device.

As such, in one or more embodiments methods described herein can further require identification of the user. For example, in one or more embodiments the physical sensors (107) can work with the heuristic sensor processor (109) to function as a facial recognition device, audio recognition device, iris scan device, fingerprint detector, electronic tag detector for a trusted companion device, such as a smart watch, or other identification device to determine a detected person's identity 508. Working in conjunction, the one or more processors (103) can identify, at least with a predefined level of certainty, that the person detected within an environment of the electronic device is actually the owner of the device. When this is the case, the one or more processors (103) can cause the electronic device to execute a control operation in response to a device command. In one or more embodiments, the one or more processors (103) execute the control operation only where the identity (508) of the user matches the predefined criterion (112).

In one or more embodiments, the voice interface engine (110) can determine the identity of a person from a voiceprint 509 that serves as a multi-modal social cue. For example, the audio capture device (215) might sample audio input to look for a pattern matching the known voiceprint 509 of an owner of an electronic device. The voiceprint 509 can define one or more biometric characteristics associated with the owner with some level of uniqueness. If a match between the sampled signals and the known biometric voiceprint 509, the one or more processors (103) can execute a control operation in response to a device command.

Information relating to an emotional state 511 or a user, which is also a multi-modal social cue 500, can also be obtained in this manner. The audio capture device (215) might sample audio input to look for a pattern matching known voice inflections or known words to determine information relating to an emotional state 511. Similarly, an intelligent imager (210) may search for smiles or frowns or furrowed eyebrows in images to determine information relating to an emotional state 511 of a user. Thus, in one or more embodiments the multi-modal social cues 500 comprise information relating to an emotional state 511 of one or more persons in an environment of an electronic device.

In one or more embodiments, a multi-modal social cue 500 can be responsive to an output to confirm the device command 512. If, for example, the device command is "call my wife," in one or more embodiments an output device of the other components (106) may prompt the user with output to confirm the device command 512. In this example, the output to confirm the device command 512 may be a loudspeaker asking, "Would you like me to call your wife?" If the command was parsed properly, the user will deliver a confirmation 513 to the device command, which can be received by the audio capture device (215). In this example, the confirmation 513 can simply be the user stating, "yes." Accordingly, the device the command will be executed. If the command was parsed in error, the user will say "no" and the system will use this feedback to learn and improve its accuracy.

In one or more embodiments, the one or more multi-modal social cues 500 can comprise interaction with a companion device, such as a smart watch, smart ring, wireless communication accessory, charger, docking station, or other device. For example, in one embodiment the one or more multi-modal social cues comprise electronically identifying 514 a companion device to the electronic device. It is contemplated that the companion device may also be equipped with sensors, and thus may be able to detect gestures. Thus, in one or more embodiments the multi-modal social cue 500 can also include receiving an electronic communication 514 indicting the companion device has detected a gesture. For instance, the companion device may be a watch, pen or other "smart" device that is sensing the users gestures with greater fidelity since it is on the body of the user.

In one or more embodiments, multi-modal social cues 500 can be gleaned by a number of people within a thermal radius of an electronic device. For example, in one embodiment the proximity detector components (206) or proximity sensor components (207) can determine how many people 515 are within an environment about the electronic device. Embodiments of the disclosure contemplate that when multiple people are within the immediate environment, utterances are more likely to be conversational rather than device commands. By contrast, when only one person, and more specifically the owner, is within the environment, utterances are more likely to be device commands. Thus, in one embodiment the control operation is executed only where a predefined person, namely, the owner of the electronic device, is within the environment.

Of course, any of the information 516 gleaned from the context sensors (108) shown in FIG. 3 could be used as multi-modal social cues 500 as well. This includes mood information relating to a person's mood based upon contextual information received from the physical sensors (107), a person's emotional state inferred from contextual information received from the physical sensors (107), calendar information and events 320, wellness information (303), alarm information (304), device usage data (321), energy storage (307) information, consumer purchase information (311), device usage profiles (312), formal rules and policies (310), familial rules and policies (313), application data (314), social media 318 information, location information 315, repetitive behavior information 319, device settings 316, device operating mode information 309, and so forth.

Turning now back to FIG. 4, at decision 405 the method 400 determines whether the one or more multi-modal social cues (500) detected at step 404 meet one or more predefined criteria (112) stored in memory (104). Where the one or more multi-modal social cues (500) match the one or more predefined criteria (112), the method 400 executes, with the one or more processors (103), a control operation in response to the device command at step 406. Otherwise, the device command is ignored at step 407.

Embodiments of the disclosure contemplate that machines are not perfect, and occasionally a device command will be accidentally ignored. To ensure that the proper control operation occurs, in one or more embodiments the method 400 includes also receiving additional user input. For example, if a device command was ignored, the user may shake the device while restating the device command. The motion detectors (204) can detect this shaking as additional user input. Whether additional user input is received is determined at decision 408. In one or more embodiments, where the one or more multi-modal social cues (500) fail to match the one or more predefined criteria (112), and where the one or more additional user inputs are received as determined at decision 408, the method 400 includes still executing, with the one or more processors (103), the control operation in response to the device command at step 406.

Figure 6:
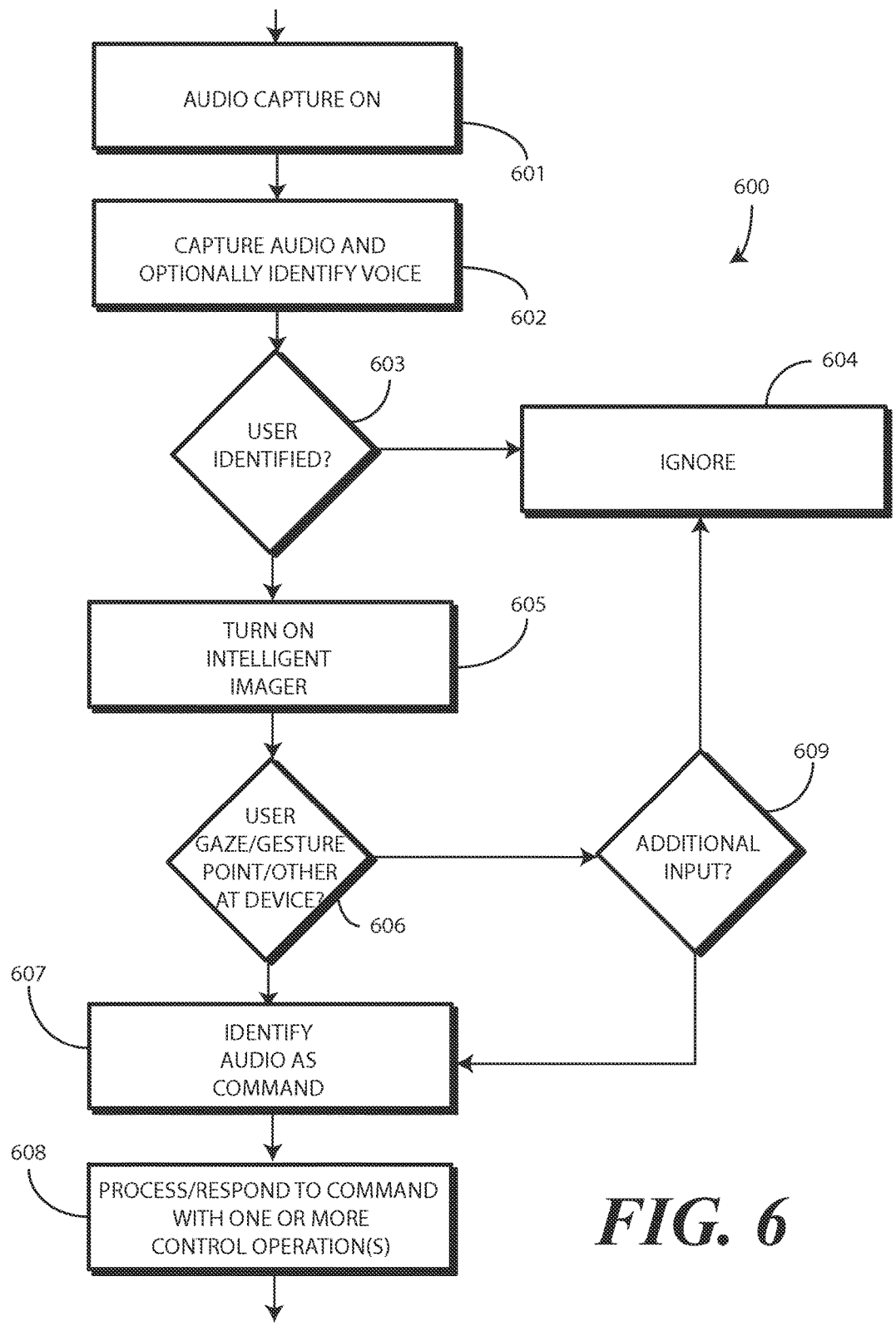
FIG. 6 illustrates another explanatory method in accordance with one or more embodiments of the disclosure.

While the method 400 of FIG. 4 illustrated a general method of operating an electronic device, further advantages of embodiments of the disclosure are revealed by another illustrative example. Turning now to FIG. 6 is a method 600 corresponding to one particular example. Other examples in accordance with the general method (400) of FIG. 4 will be readily obvious to those of ordinary skill in the art having the benefit of this disclosure.

Beginning with step 601, an audio capture device (215) is operational. At step 602, the audio capture device (215) captures audio input comprising a device command.

At decision 603, the method 600 determines, with a voice interface engine (110) operable with the audio capture device (215), whether a predefined user can be identified. As noted above, this can occur in numerous ways. For example, in one or more embodiments the physical sensors (107) can work with the heuristic sensor processor (109) to function as a facial recognition device, audio recognition device, iris scan device, fingerprint detector, electronic tag detector for a trusted companion device, such as a smart watch, or other identification device to determine a detected person's identity (508). Alternatively, the voice interface engine (110) can determine the identity of a person from a voiceprint (509) that serves as a multi-modal social cue. Other identification techniques will be obvious to those of ordinary skill in the art having the benefit of this disclosure. In one embodiment, when a predefined user, i.e., the owner of the electronic device, is not identified, the device command can be ignored at step 604.

In one embodiment, when the predefined user is identified, the method 600 actuates an intelligent imager (210) at step 605. Step 605 can also include receiving, with the intelligent imager, one or more multi-modal social cues (500).

At decision 606, the method 600 determines, with one or more processors (103), whether the one or more multi-modal social cues (500) match one or more predefined criteria (112). Where the one or more multi-modal social cues (500) match one or more predefined criteria (112), the method 600 can identify the device command at step 607. The method 600 can execute a control operation in response to the device command at step 608. As with FIG. 4, if the command is missed and additional input is received as determined at decision 609, the method 600 can still execute a control operation in response to the device command at step 608.

The method 600 of FIG. 6 is illustrative of the following use case: At step 601, an always-ON microphone can be actuated. This microphone can sample ambient acoustic signals at step 602. As determined at decision 603, the method 600 can to look for a pattern matching the known voiceprint (509). If a match between the sampled signals and the known voiceprint (509) is found, then the method 600 can briefly turn on a wide-angle front facing camera at step 605 and analyze the real-time image to see if the user is gazing in the direction of the electronic device, as determined at decision 606. If the user is in fact gazing at the electronic device, at step 607 the method 600 will process the buffered audio signal, perform speech-to-text conversion, and parse the words to determine if any meaningful commands were uttered that the electronic device is able to act upon. If a meaningful action is determined, the command will be executed at step 608.

Figure 7:
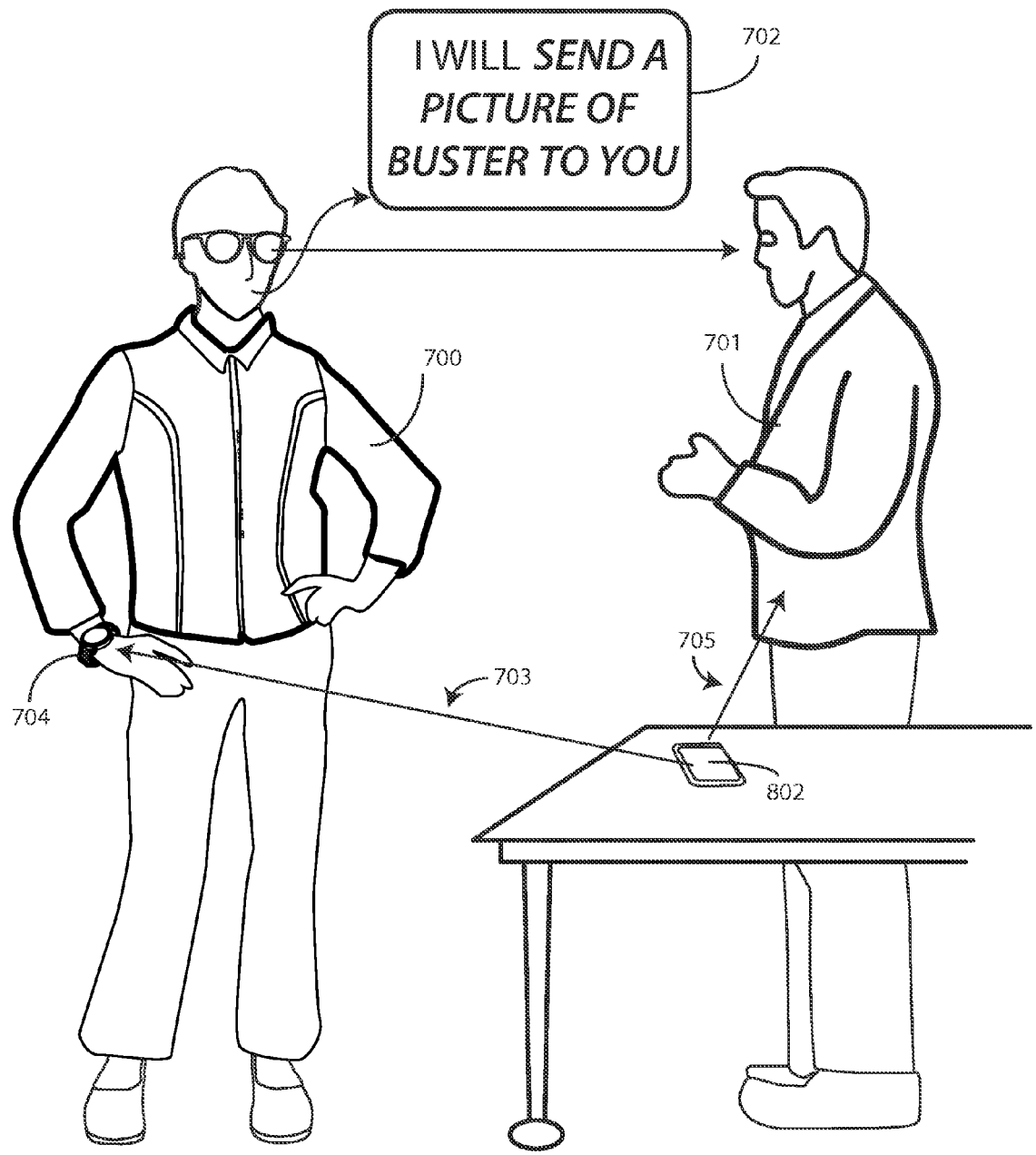
FIG. 7 illustrates one explanatory electronic device in use, with the explanatory electronic device using one or more methods, systems, or sensors in accordance with one or more embodiments of the disclosure.
Figure 8:
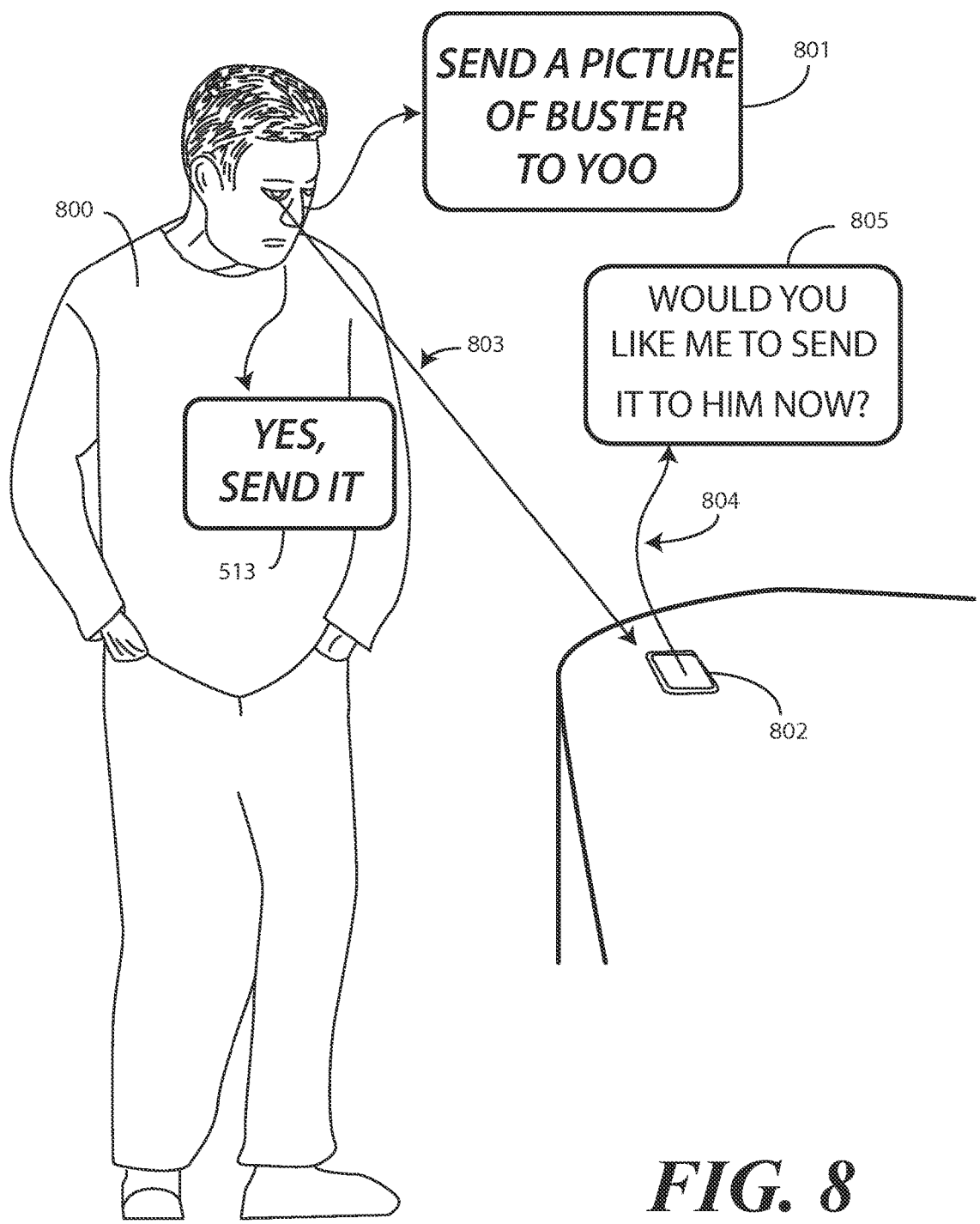
FIG. 8 illustrates one explanatory electronic device in use, with the explanatory electronic device using one or more methods, systems, or sensors in accordance with one or more embodiments of the disclosure.

Benefits of the disclosure will be further illustrated by comparing FIGS. 7 and 8. In FIG. 7, a user 700 is making a conversational statement 702 telling another party 701 that they will send a picture of Buster to the other party 701. By contrast, in FIG. 8 another user 800 is issuing a device command 801 instructing an electronic device 802 configured in accordance with one or more embodiments of the disclosure to send a picture of Buster to a person named Yoo. The two statements sound eerily the same, and with prior art devices one would never expect an electronic device to discern the difference. However, advantageously, in one or more embodiments the one or more processors of the electronic device 802 can distinguish whether the device command is directed to the electronic device 802, or is instead merely a conversational statement directed to another person. Embodiments of the disclosure contemplate that some device commands can sound like mere conversational statements. Using multi-modal social cues such as gaze and other cues described above, in one or more embodiments the one or more processors can distinguish whether a device command is directed to the electronic device 802 as a function of the multi-modal social cues, or is instead a statement intended for a person that should be ignored. In one or more embodiments, the one or more processors can execute the control operation only upon detecting the device command is intended for the electronic device. Thus, using embodiments of the disclosure the device command 801 gets executed and the conversational statement 702 intended for another person gets ignored. This is despite the fact that the device command 801 can sound exactly like the conversational statement 702.

Similarly, embodiments of the disclosure can result in the one or more processors discriminating between two identically sounding statements that have different intentions. For example, the statement, "Yoo can cook," and the question "You can cook?" sound exactly alike. However, in one or more embodiments the one or more processors can discriminate between these phrases as a function of the multi-modal social cues. In one or more embodiments, the one or more processors can thus execute different control operations as a function of social cues. Accordingly, in one or more embodiments social cue information can be used to inform the heuristics of the original intent to determine which control operation to execute, if any. Thus, in one or more embodiments the one or more processors can determine whether a detect device command is a first device command or a second device command from the one or more multi-modal social cues, and where the device command is the first device command, execute the control operation. By contrast, where the device command is the second device command, the one or more processors can execute a different control operation.

At FIG. 7, an electronic device 802 configured in accordance with one or more embodiments of the disclosure detects 703 user 700 as a predefined owner of the electronic device 802. In this illustrative embodiment, the electronic device 802 electronically identifying a companion device 704 worn by the user 700, which in this case is a smart watch that has been paired to the electronic device 802 to define the smart watch as a trusted device owned by a predefined user, namely, the owner of the electronic device 802.

Using its always-ON microphone, the electronic device captures the conversational statement 702. To be sure, the conversational statement 702 could be a device command. However, in this example the conversational statement 702 is to be ignored. This is true for two reasons: First, the user 700 fails to make a multi-modal social cue (500) confirming that the conversational statement 702 is a device command. Instead, the user 700 is looking directly at the other person 701. Second, the electronic device 802 determines 705 the other person 701 within the environment and has been programmed to execute control operations in response to device commands only when the predefined user is the only person in the environment. Accordingly, the conversational statement is ignored. If this occurs in error, the user 700 can deliver additional user input. For example, the user may make a gesture that is detected by the companion device 704. The companion device 704 may then transmit an electronic communication indicting the companion device has detected a gesture, thereby causing a control operation to be executed.

By contrast, in FIG. 8 the user 800 makes a multi-modal social cue (500) by delivering a gaze 803 toward the electronic device 802. This confirms that the device command 801 is in fact a device command 801. In this illustrative embodiment, the electronic device 802 delivers 804, with an output device, output 805 to confirm the device command 801. The electronic device 802 then receives, with an audio capture device, a confirmation 513 of the device command 801. Thus, the electronic device 802 can compose an email comprising a picture of Buster to send to Yoo. The user 800 was able to cause the electronic device 802 to do this without complex manipulation of the electronic device 802. Instead, the user 800 merely needed to execute a simple social cue to accurately and swiftly cause the electronic device 802 to execute a control operation in response to the device command 801.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
receiving, with an audio capture device, audio input, wherein the audio capture device comprises a microphone in an always ON state;
identifying, with one or more processors, whether a device command is present in the audio input;
determining, with a voice interface engine, an identity of a user from the audio input;
detecting, with one or more sensors, one or more multi-modal social cues from an environment about the electronic device;
where the device command is present in the audio input, corroborating, from the one or more multi-modal social cues, that the device command is intended for the electronic device; and
executing, with the one or more processors, a control operation in response to the device command only where the user is identified as an owner of the electronic device and corroboration from the one or more multi-modal social cues confirms that the device command is intended for the electronic device.

2. The method of claim 1, further comprising actuating a wide-angle camera and capturing an image in response to identifying that the device command is present in the audio input, wherein the one or more multi-modal social cues comprise a gaze toward the electronic device, wherein the corroborating that the device command is intended for the electronic device comprises analyzing the image to determine if the owner of the electronic device is gazing toward the electronic device.

3. The method of claim 2, wherein the one or more multi-modal social cues comprise the gaze toward the electronic device, wherein the detecting the gaze comprises detecting a gaze cone corresponding to a detected gaze direction and determining whether the electronic device is within the gaze cone.

4. The method of claim 3, further comprising further confirming that the user is the owner of the electronic device by capturing an image of the environment of the electronic device in response to identifying that the device command is present in the audio input, analyzing the image to confirm that a face of the owner is present in the image, the executing occurring only where the face of the owner is present in the image.

5. The method of claim 1, further comprising actuating a wide-angle camera and capturing an image in response to identifying that the device command is present in the audio input, wherein the one or more multi-modal social cues comprise a physical gesture, wherein the corroborating that the device command is intended for the electronic device comprises analyzing the image to determine if the owner of the electronic device is pointing a finger toward the electronic device.

6. The method of claim 1, wherein the one or more multi-modal social cues comprise:
electronically identifying a companion device to the electronic device; and receiving an electronic communication indicting the companion device has detected a gesture, wherein the corroborating that the device command is intended for the electronic device comprises determining, from the companion device, that the owner of the electronic device made the gesture.

7. A method in an electronic device, comprising:
receiving, with an audio capture device, audio input;
determining, with one or more processors, whether the audio input comprises a device command;
determining, with a voice interface engine operable with the audio capture device, whether a predefined user can be identified from the audio input;
where both the audio input comprises the device command and the predefined user is identified, actuating, with one or more processors, an intelligent imager;
receiving, with the intelligent imager, one or more multi-modal social cues and confirming, with the intelligent imager, the predefined user is an owner of the electronic device;
determining, with the one or more processors, whether the one or more multi-modal social cues match one or more predefined criteria; and
where both the one or more multi-modal social cues match the one or more predefined criteria and the predefined user is confirmed as the owner of the electronic device, executing, with the one or more processors, a control operation in response to the device command.

8. The method of claim 7, further comprising delivering, with an output device, output to confirm the device command.

9. The method of claim 8, further comprising also receiving, with the audio capture device, a confirmation of the device command.

10. The method of claim 7, further comprising determining, with one or more proximity sensors, how many people are within an environment about the electronic device.

11. The method of claim 10, the executing occurring only where the predefined user is the only person about the electronic device.

12. The method of claim 10, further comprising receiving additional user input and, where the one or more multi-modal social cues fail to match the one or more predefined criteria, still executing the control operation in response to the device command.

13. The method of claim 7, the one or more multi-modal social cues comprising one or more of:
a gaze toward the electronic device;
a gesture toward the electronic device; or
an image of the predefined user comprising mood information corresponding to the predefined user.

14. An electronic device, comprising:
one or more processors;
an audio capture device, operable with the one or more processors; and
one or more sensors, operable with the one or more processors, the one or more sensors cascaded in a predefined order to detect a plurality of multi-modal social cues to determine whether a device command is intended for the electronic device;
the one or more processors:
causing the audio capture device to receive an audio input;
identifying, from signals from the audio capture device, the device command from the audio input;
determining an identity of a user from the audio input, and where the user and the device command are identified, delivering an audio prompt requesting confirmation that the device command should be executed;
receiving additional audio input;
identifying, from signals from the audio capture device, a confirmation command from the additional audio input;
detecting, with the one or more sensors, one or more multi-modal social cues from an environment about the electronic device; and
where the one or more multi-modal social cues match one or more predefined criteria, the confirmation command is identified from the additional audio input, and the user is identified from the audio input, executing a control operation in response to the device command;
the one or more processors further distinguishing, with the one or more sensors, whether the device command is directed at the electronic device as a function of the one or more multi-modal social cues, and to execute the control operation only when the device command is directed to the electronic device.

15. The electronic device of claim 14, the one or more sensors comprising an intelligent imager to detect a gaze toward the electronic device.

16. The electronic device of claim 15, wherein the one or more social cues comprise an approach gesture.

17. The electronic device of claim 14, the one or more processors to:
determine whether the device command is a first device command or a second device command from the one or more multi-modal social cues; and
where the device command is the first device command, execute the control operation; and
where the device command is the second device command, execute a different control operation.

18. The electronic device of claim 14, wherein when the additional audio input fails to include the confirmation command, employing, by the one or more processors, the additional audio input to improve accuracy in identifying whether received audio input includes confirmation commands.

* * * * *